Inventor
CARL W. BRABENDER
By Williamson, Williamson, Schroeder, & Adams
Attorneys United States Patent Office 2,808,720
Patented Oct. 8, 1957

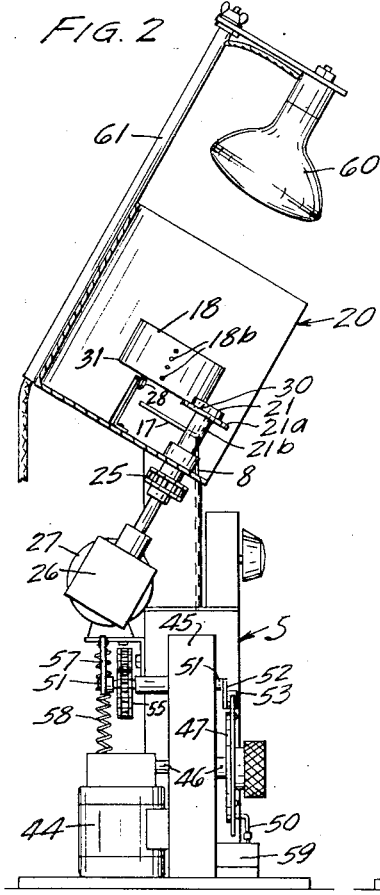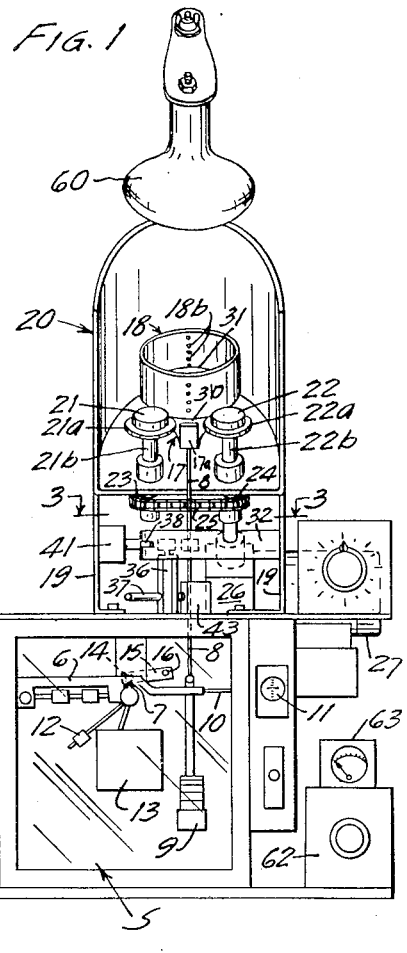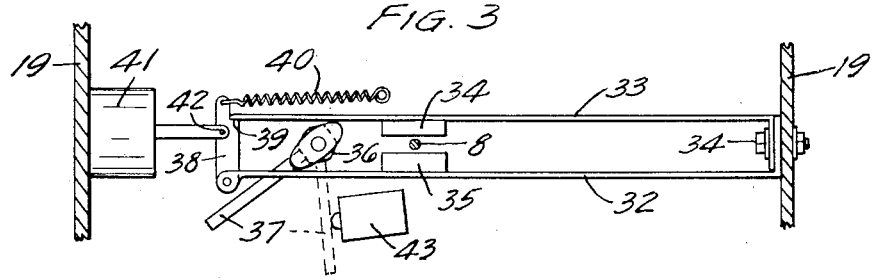

2,808,720

MOISTURE DETERMINER WITH DETERMINATION PRESERVING APPARATUS

Carl W. Brabender, Minneapolis, Minn., assignor to Pillsbury Mills, Inc., Minneapolis, Minn., a corporation of Delaware Original application January 21, 1954, Serial No. 405,488. Divided and this application February 8, 1954, Serial No. 408,876

9 Claims. (Cl. 73—76)

This invention relates to moisture determining apparatus. More particularly, it relates to apparatus for quickly and efficiently driving off the volatile contents of a sample of granular material and determining the percentage of loss of weight by the sample as a consequence thereof, and for automatically preserving the results of the determination for future reference.

This application is a divisional application of my co-pending application for patent filed by me in the United States Patent Office on January 21, 1954, entitled "Moisture Determining Apparatus (Inclined Axis)," Serial No. 405,488. My copending application is directed toward protecting the novel and improved apparatus for drying a sample of granular material quickly and efficiently without sacrificing accuracy and by methods which will overcome the objections of certain scientists who refuse to accept generally recognized methods and apparatus. The instant application is directed toward protecting the novel combination of elements which preserves the results of the determination indefinitely for future reference.

In apparatus heretofore known for use in accurately determining the moisture content of granular materials, it has been necessary for the operator to remain close at hand to the moisture determining apparatus once the determination is started in order to be available to read the results of the determination as soon as the drying operation is completed. If the determination is completed while the operator is not close at hand, the sample will absorb moisture from the air and consequently take on weight and provide an inaccurate reading upon the return of the operator. When this happens, it has been necessary for the operator to repeat the determination with a consequent loss of time and effort. My present invention is directed toward eliminating these disadvantages.

It is a general object of my invention to provide novel and improved moisture determining apparatus which will automatically preserve the results of the determinations indefinitely for future reference.

Another object is to provide novel moisture determining apparatus which will enable the operator to commence the determination and leave the apparatus, thereafter to return at his leisure in order to observe and record the results of each determination.

Another object is to provide apparatus for determining the moisture content of a sample of granular material which will automatically preserve the results of each determination for an indeterminate period and until released subsequently by the one conducting the determination.

Another object is to provide novel moisture determining apparatus which will introduce uniformity and standardization in the conductance of a series of moisture content determinations by insuring that the reading will be taken at a given interval after the determination of each of the successive driving operations.

These and other objects and advantages of my invention will more fully appear from the following description made in connection with the accompanying drawings, wherein like reference characters refer to the same or similar parts throughout the several views, and in which:

Fig. 1 is a front elevational view of one embodiment of my invention;

Fig. 2 is a side elevational view of the same;

Fig. 3 is a horizontal sectional view on an enlarged scale taken along line 3—3 of Fig. 1;

Figure 4:
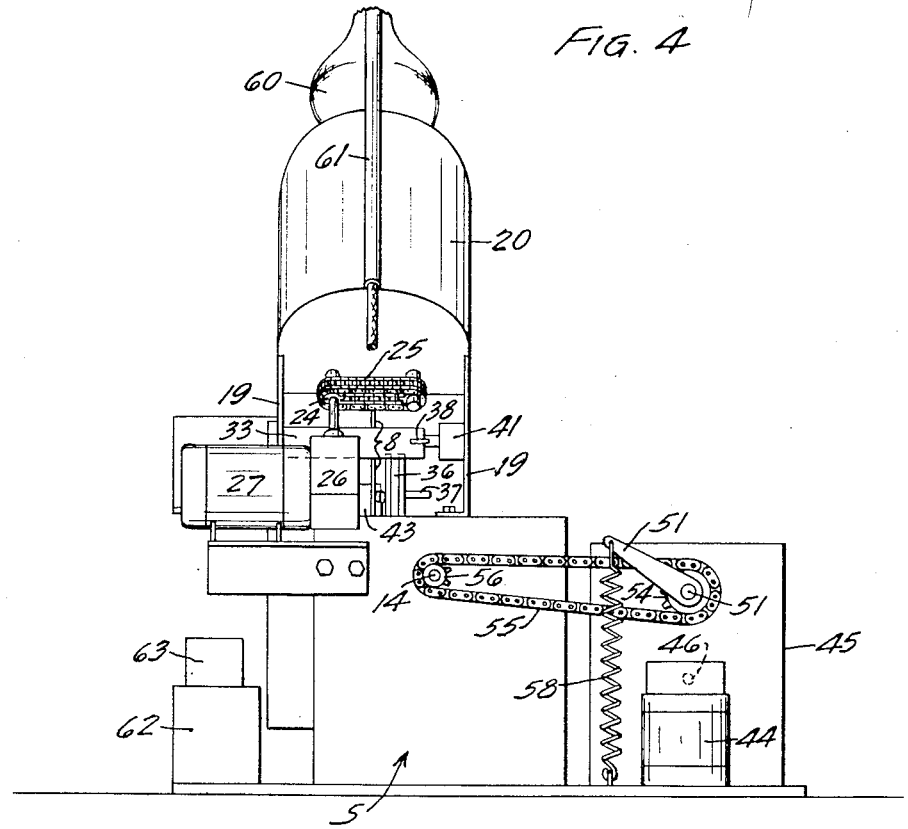
Fig. 4 is a rear elevational view of the same.

One embodiment of my invention, as shown in Figs. 1–5, may include a weighing mechanism or scale S which is encased in a substantially closed compartment to prevent air currents from influencing the same. This weighing mechanism or scale S is comprised of a steel yard or beam 6 which is pivoted as at 7 and which is provided at its right hand end as viewed in Fig. 1 with a pan carrier support or rod 8 and a dependent counter-weight 9. As shown, the pan carrier support 8 is pivotally mounted on the right hand end of the steel yard 6. Extending laterally from the right hand end portion of the steel yard 6 is an indicating arm 10 which will provide a direct scale reading on the moisture percentage indicator 11. The steel yard 6 is provided, as shown, with a counter-bar 12 and a dampener 13. The pan carrier support rod 8 extends upwardly through the wall of the compartment in free sliding relation thereto. The scale S is preferably of the type disclosed in my prior United States Letters Patent No. 2,047,765, entitled "Apparatus for the Determination of Moisture," and issued July 14, 1936.

Extending inwardly through the back wall of the closed compartment is a shaft 14 which is mounted therein for rotation about its longitudinal axis and which has mounted thereon a lever 15 which extends laterally from the shaft. The lever 15 has a forwardly extending control arm 16 which extends forwardly above the right hand end portion of the beam or steel yard 6 so that when the shaft 14 is pivoted so as to cause the lever 15 to descend, the control arm 16 will engage the beam 6 and lower the right hand end portion thereof and will also lower the pan carrier support 8.

Figure 5:
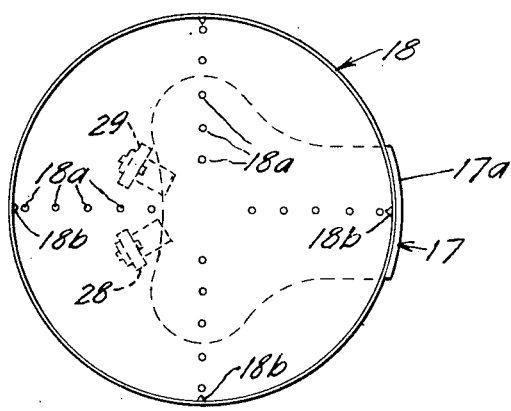
Fig. 5 is a plan view on an enlarged scale of the sample pan with the pan carrier shown in broken lines.

Carried by the upper end portion of the pan carrier support rod 8 is a pan carrier 17 which is adapted to engage and support a sample pan 18. As best shown in Fig. 5, the sample pan carrier 17 is comprised of a flat plate which is generally T-shaped and extends rearwardly and slightly upwardly on an inclined plane from the pan carrier support rod 8. Extending upwardly from the forward end of the plate 17 is a flange 17a which is shaped concentrically with the pan 18 so as to complement the shape thereof. This can best be seen in Fig. 5 which readily shows that the entire pan carrier 17 is complementary in shape to the pan 18 so that when the pan carrier 17 is lifted from a position directly below the pan, the latter will be firmly supported by the pan carrier 17.

Mounted on the top of the scale S and extending upwardly therefrom is a framework 19 which supports a shell 20. Rotatably mounted on this shell 20 is a pair of laterally spaced flanged roller elements 21 and 22. The flanges 21a and 22a of these roller elements extend outwardly adjacent the lower end portions of the rollers and have their upper surfaces extending in a plane parallel to the plane of the T-shaped portion of the pan carrier 17. The shafts 21b and 22b upon which these rollers are mounted, extend downwardly through the shell 20 upon which they are rotatably mounted and carry sprocket gears 23 and 24 at their lower respective ends. These gears are drivably connected by a sprocket chain 25. The shaft 22b extends downwardly to a low level where it is driven through a gear element 26 by an electric driving motor 27.

Mounted upon the shell 20, as best shown in Figs. 2 and 5, is a pair of rollers 28 and 29. These rollers 28 and 29 are mounted for free rotation about inclined axes which extend outwardly from a central point between these two rollers and the two rollers 21 and 22. This central point is preferably directly below the center of the pan 18 when the latter is positioned as shown in Figs. 1 and 2. The upper surfaces of these rollers extend in the same general inclined plane as the upper surfaces of the flanges 21a and 22a of the rollers 21 and 22 so that they cooperatively provide a support for the pan 18 on an inclined plane.

The pan 18, as best shown in Fig. 5, is provided with a plurality of deformations in the form of upwardly extending teats 18a which are formed in the bottom portion of the pan. Some inwardly extending teats 18b are also formed on the vertical side walls of the pan. These teats 18a and 18b insure that even the most free-flowing of granular materials will be carried along with the bottom portion of the pan 18 from the lower portion of the bottom of the pan as at 30 to the upper portion of the bottom of the pan as at 31 during the rotation of the pan. A sample of granular material placed within the pan 18 will, upon rotation of the pan, have portions thereof carried along the upwardly inclined plane until gravity will cause the same to roll downwardly to the lower portions. In this manner, any sample placed within the pan and rotated therewith will have its upper surface constantly agitated and exchanged so that different portions of the sample will be constantly presented to the source of heat.

Mounted on the upper surface of the scale S on opposite sides of and extending normally to the pan carrier support 8, is a pair of spring metal clamping straps 32 and 33 which are so mounted as at 34 to cause the two to be constantly urged toward each other. A pair of brake blocks 35a and 35 are carried by this pair of spring metal straps 32 and 33 on opposite sides of the pan carrier support 8. This can best be seen in Fig. 3. Rotatably mounted upon the upper surface of the scale S below and extending upwardly between the straps 32 and 33, is a cam post 36. This cam post 36 has a lever handle 37 extending outwardly therefrom with which the cam post may be rotated. As best shown in Fig. 3, the cam post 36 is somewhat elliptical in shape so that when the handle 37 is in the dotted line position shown in Fig. 3, the spring blocks 34 and 35 will be held in spaced relation to the pan carrier support 8. When the cam post is in the position shown in full lines in Fig. 3, the spring straps 32 and 33 will cause the spring blocks 34 and 35 to engage the pan carrier support 8 and clamp it fixedly relative thereto upon the release of the trip element to be hereinafter described.

Pivotally mounted upon the free end of the spring strap 32, as best shown in Fig. 3, is a trip element or catch 38 which has an indentation or latch element formed therein as at 39. A spring 40 urges the trip element 38 toward the pan carrier support 8. An electromagnet 41 is mounted upon the support 19 and is pivotally connected as at 42 to the trip element 38.

Mounted upon the upper wall of the compartment enclosing the scale and adjacent to the handle 37 in position to be engaged thereby when the handle is swung to the dotted line position shown in Fig. 1, is a starting switch 43. This starting switch is connected to the driving motor 27 to start the same and is also connected to a running motor and an infra-red lamp to be hereinafter referred to.

Positioned adjacent the compartment enclosing the scale S is a variable timing motor 44. This timing motor has its shaft extending into a gear box 45 which in turn has a shaft 46 extending outwardly from the opposite side thereof. A disc 47 is mounted on the shaft 46 and outwardly of the disc, and on the shaft 46 is mounted a cam block 48. The cam block carries a relatively broad cam 49 and a relatively narrow cam 50 at opposite ends of the block. The cam 50 is offset relative to the cam 49.

Extending through the housing of the gear box 45 is a shaft 51 which has a small lever 52 connected thereto, the latter carrying a roller 53 at the outer end portions thereof. The roller 53 is positioned so as to be engaged by the cam 49 as it rotates with the shaft 46. On the opposite and back side of the gear box mounted on the shaft 51 is a sprocket gear 54. This gear 54 is connected by a chain 55 to a second sprocket gear 56 which is carried on the end of the shaft 14 which extends through the back of the scale-encasing compartment. A lever 57 is mounted on the shaft 46 and is constantly drawn downwardly by a spring 58.

Mounted on the gear casing 45 on the forward side thereof is a running, single pole, double throw switch 59 positioned so as to be engaged by the sharp cam 50 as it rotates with the shaft 46. This switch 59 is in parallel with the starting switch 43 so that either will close the circuit to the driving motor 27, the timing motor 44 and the source of heat to be applied to the sample. This source of heat, as shown, is an infra-red lamp 60 mounted on a rod 61 upon the shell 20. The rod 61 is pivotable about its longitudinal axis so that the lamp 60 may be swung to either side as desired. The source of power to the lamp 60 is regulated by means of a variable transformer 62 and a voltmeter 63 which will indicate any fluctuations in the voltage so that the determinations may always be made, if so desired, at the same voltage.

In operation, a sample of a predetermined weight is placed within the sample pan 18 and the pan is placed so that its bottom will rest upon the flanges 21a and 22a of the rollers 21 and 22 and upon the upper surface of the rollers 28 and 29. If desired, the sample may be weighed within the pan and the pan may then be positioned as described. The lever 37 is then swung to the dotted line position shown in Fig. 3 so as to provide power to the driving motor 27 and the infra-red lamp 60 as well as the timing motor 44. The timing motor thereupon will cause the cam block to rotate with the shaft 46 so that the cam 50, which at the termination of the previous run engaged the switch 59, will move away from the switch and permit that switch to close the running circuit to the driving motor 27, the timing motor 44 and the lamp 60.

The driving motor 27 will drive the roller 22 and cause the pan 18 to turn with that roller and upon the other three rollers 21, 28 and 29. The chain 25 between the rollers 21 and 22 will drive the roller 21 so that that roller will aid in rotating the pan 18 about its inclined but upright axis. While so rotating, portions of the sample will be carried around with the pan to the more upper portions as at the point 31, and gravity acting thereupon will cause the sample portions to roll downwardly toward the rollers 21 and 22. In this manner, all portions of the sample will be constantly and continuously agitated and the portions thereof which comprise the upper surface of the sample will be carried downwardly and covered up by portions of the sample which previously were below the upper surface thereof. The steady rolling and mixing of the sample constantly changes the upper surface and presents the portions of the sample bearing the greater percentage of moisture to the heat rays of the lamp 60. In this manner, scorching is prevented despite the fact that a very intense heat is utilized.

Toward the end of the drying operation, the cam block 48 will have reached the position shown in Fig. 1, the direction of rotation being shown by the arrow in that figure. As it rotates, the roller 53 will ride upwardly on the beveled edge of the cam block 49 as shown in Fig. 1, thereby causing the lever 52 to swing upwardly and the shaft 51 to rotate in a counter-clockwise direction when viewed from the front of the apparatus. This rotation of the shaft 51 causes the lever 57 to swing upwardly against the tension of the spring 58. At the same time, the gear 54 will turn and by means of the chain 55 will cause the gear 56 to also turn to rotate the shaft 14. Rotation of the shaft 14 will cause the lever 15 and the control arm 16 to swing upwardly and release the beam or steel yard 6 so that the right hand end portion thereof as viewed in Fig. 1 may swing upwardly. The upward movement of the right hand end portion of the steel yard will cause the pan carrier support 8 to rise therewith and will cause the pan carrier 17 to engage the pan 18 and lift the same upwardly, free of the rollers 21, 22, 28 and 29. This brings the scale into operation and causes the scale to weigh the pan and the sample. The indicator 10 will show upon the moisture percentage indicator 11 in direct reading, the percentage of the sample which was lost as a result of the drying operation. Through this weighing operation, the lamp 60 remains energized so that no moisture may be absorbed from the air by the sample and hence no inaccuracies are introduced with such absorption.

A brief interval exists between the time when the pan carrier support 17 engages the pan 18 and lifts the same and the scale is brought into operation, and the time when the narrow cam 50 engages the switch 59. During that interval, the scale has an opportunity to come to balance at the proper weight. By the time the beam 6 has ceased to swing about its pivot and has come to rest at the correct weight indication, the cam 50 will engage the switch 59 and break the circuit to the driving motor 27, the timing motor 44 and the lamp. At the same time, this switch closes the circuit to the electromagnet 41 and thereby energizes the same. Energization of the electromagnet 41 causes the trip element 38 to be drawn away from the pan carrier support 8, thereby permitting the break blocks 34 and 35 to move toward each other and positively engage the pan carrier support 8 and clamp the same tightly therebetween at a fixed position. This, of course, locks the scale in the weighed position and preserves the results of the determination until the operator returns and commences a new determination. This means that the cam 50 at the end of the determination comes to rest in engaging relation with the switch 59 and the scale is locked in its last weighing position.

When the next determination is started, the operator merely moves the lever 37 to the dotted line position shown in Fig. 3, whereupon the cam 36 will spread the spring straps 32 and 33 and the spring 40 and draw the trip element 38 therebetween to maintain them in spread position until the electromagnet 41 is subsequently energized as described above. The operator needs only hold the lever 37 against the switch 43 until such time as the timing motor 44 has driven the cam 50 out of engagement with the driving switch 59 and thereafter he may release the lever since the driving switch will maintain the circuits to the driving motor and the timing motor as well as the lamp throughout the remainder of the drying operation.

Thus it can be seen that I have provided novel and improved moisture determining apparatus which will automatically preserve the results of any particular determination for an indeterminate period after the termination of the drying operation. It will be readily appreciated that the operator of the apparatus may commence a determination with a machine embodying my invention and leave the same to return any desired length of time thereafter with full assurance that upon his return the results of the determination will be preserved for him. The automatically energized clamping device which locks the scale in the weighing position automatically at the end of the weighing operation insures that regardless of the amount of moisture absorbed by the sample within the sample pan, the results of the determination will be preserved and can be read from the indicating scale. Thus it can be seen that a substantial saving in time can be effected through the use of my apparatus where it is necessary for the operator to either indulge in a number of determinations simultaneously or partake in a number of different projects at a given time. Once the initial sample has been weighed and placed upon the pan carrier and the apparatus has been placed in operation, the operator may leave the same and the determination will be carried on automatically and the results thereof will be preserved for future observance by the operator upon his return.

In conducting a series of moisture content determinations, the operator is assured through the use of my novel apparatus that the readings which are taken are always taken at the same predetermined intervals of time after the weighing and drying operations are completed. Thus, if any moisture whatsoever is absorbed by the sample, however minute, for comparable purposes the determination must necessarily be substantially 100 percent accurate, for the period during which moisture might possibly be absorbed will be the same for each determination. This standardization and means for determining the moisture content of samples of granular material completely overcomes any objections to inaccuracies introduced by absorption of moisture from the air.

It will be noted that the speed of rotation of the pan 18 will readily be varied as desired in accordance with the nature and texture of the material to be dried. It is also possible to vary the speed of rotation of the pan during the various stages of a single determination. This variation in speed of rotation of the pan 18 may be obtained, of course, through adjustment of the variable speed motor 27. It will also be noted that the angle of inclination from vertical of the axis of rotation of the pan 13, as shown in Fig. 1, is approximately thirty (30) degrees for use in the drying of wheat flour. It will be readily appreciated that the angle of inclination of the axis of rotation of the pan 18 may be varied in accordance with the nature and texture of the material to be dried and the speed of rotation used. The angle of inclination and the speed of rotation, in any event, must be so correlated as to cause the material to be dried to be carried upwardly at least part way toward the uppermost elevation of the bottom of the pan 18 as it rotates and to thereupon roll downwardly to the lowermost portions of the bottom of the pan, thereby accomplishing a constant stirring and mixing of the material to be dried.

It will, of course, be understood that various changes may be made in the form, details, arrangement and proportions of the various parts without departing from the scope of my invention.

What I claim is:

1. In apparatus for quickly determining the volatile contents of a sample of granular material and for automatically preserving the results of the determination, the combination of a weighing scale having a tiltable beam, a pan carrier, pan carrier support structure connecting said pan carrier with one end portion of said beam for vertical movement therewith and supporting said pan carrier and being movable downwardly with said pan carrier and said end portion to a retracted position by tilting said beam, releasable mechanism connected with said beam for tilting the same and thereby holding said pan carrier in retracted position, means for supporting a sample pan with a sample of such material contained therewithin directly above said pan carrier and adjacent thereto while the latter is retracted, time-controlled means for drying the contents of such a pan while so supported without scorching the sample, time-controlled mechanism constructed and arranged to automatically release said beam tilting mechanism upon the termination of the drying operation by said last mentioned means to cause said pan carrier to be released from retracted position and to rise and lift such a pan from said supporting means to permit said scale to weigh the same, clamp mechanism mounted adjacent said pan carrier support structure in position to clamp the same in fixed position and to hold said scale in its weighing position, and time-controlled means constructed and arranged to cause said clamp mechanism at the end of a brief interval after said pan carrier support is released from said retracted position and said sample is weighed, to engage said carrier support structure and hold the same and said scale in fixed position.

2. In apparatus for quickly determining the weight of a sample of granular material and for preserving the results of the determination for future reference, the combination of a weighing scale having a tiltable beam, a pan carrier adapted to releasably engage and support a sample pan containing a sample of such material, pan carrier support structure connecting said pan carrier with one end portion of said beam for vertical movement therewith and supporting said pan carrier and being movable downwardly with said pan carrier and said end portion to a retracted position by tilting said beam, means for supporting a sample pan with a sample of such material contained therewithin directly above said pan carrier and adjacent thereto while the latter is retracted, means for forcing said beam end portion downwardly and thereby retracting said pan carrier and causing said sample pan supporting means to support the sample pan, means for heating the contents of the sample pan while the pan carrier is retracted, means for releasing said beam end portion to cause said pan carrier to rise and engage the sample pan for weighing, and mechanism actuated by said means for releasing said beam to automatically engage and hold said support structure in fixed position at the termination of the weighing operation to preserve the results of the determination for future reference.

3. In apparatus for quickly determining the weight of a sample of granular material and for preserving the results of the determination for future reference, the combination of a weighing scale having a tiltable beam, a pan carrier adapted to engage and support a sample pan containing a sample of such material, pan carrier support structure connecting said pan carrier with one end portion of said beam for vertical movement therewith and supporting said pan carrier and being movable downwardly with said pan carrier and said end portion to a retracted position by tilting said beam, means for supporting a sample pan with a sample of such material contained therewithin directly above said pan carrier and adjacent thereto while the latter is retracted, means for forcing said beam end portion downwardly and thereby retracting said pan carrier and causing said sample pan supporting means to support the sample pan, means for heating the contents of the sample pan while the pan carrier is retracted, time controlled mechanism for releasing said beam and thereby causing said pan carrier to engage and carry such a sample pan at a predetermined time for weighing of the same, and time controlled clamp mechanism coordinated with said first mentioned mechanism and mounted adjacent said support structure and constructed and arranged to engage and hold the latter in fixed position and thereby hold said scale in its weighing position shortly after said predetermined time.

4. In apparatus for quickly determining the volatile contents of a sample of granular material and for preserving the results of the determination for future reference without recording the same, the combination of a weighing scale having a tiltable beam, a pan carrier adapted to engage and support a sample pan containing a sample of such material, pan carrier support structure connecting said pan carrier with one end portion of said beam for vertical movement therewith and supporting said pan carrier and being movable downwardly with said pan carrier and said end portion to a retracted position as a result of tilting of said beam, means for supporting a sample pan with a sample of such material contained therewithin directly above said pan carrier and adjacent thereto while the latter is retracted, drying mechanism disposed adjacent said means in position to dry the contents of a sample pan when carried by said means, means for forcing said beam end portion downwardly and thereby retracting said pan carrier and causing said sample pan supporting means to support the sample pan, means for releasing said beam end portion to cause said pan carrier to rise and engage the sample pan for weighing at the end of the drying operation, clamp mechanism mounted adjacent said support structure in position to engage and hold the same in fixed position at the termination of the determination, mechanism connected with said drying mechanism for terminating the drying operation at the end of a predetermined period of time, and mechanism connected with and controlled by said last mentioned mechanism for causing said clamp mechanism to engage and fixedly hold said support structure at the termination of the weighing operation.

5. In apparatus for determining the weight of a sample of granular material and for preserving the results of the determination for future reference without recording the same, the combination of a weighing scale having a tiltable beam, a pan carrier adapted to engage and support a pan containing a sample of such material, pan carrier support structure connecting said pan carrier with one end portion of said beam for vertical movement therewith and supporting said pan carrier and being movable downwardly with said pan carrier and said end portion to a retracted position by tilting said beam, means for supporting a sample pan with a sample of such material contained therewithin directly above said pan carrier and adjacent thereto while the latter is retracted, means for forcing said beam end portion downwardly and thereby retracting said pan carrier and causing said sample pan supporting means to support the sample pan, means for drying the contents of the sample pan while the pan carrier is retracted and the pan is supported by said sample pan supporting means, means for releasing said beam end portion to cause said pan carrier to rise and engage the sample pan for weighing at the end of the drying operation, a pair of opposed clamping arms extending along opposite sides of said support structure and being resiliently urged toward each other toward a position where they will engage and hold said support structure in fixed position, releasable catch mechanism for holding said arms in spaced relation during weighing operations of said scale, electrical trip mechanism connected with said catch mechanism for releasing said catch mechanism and permitting said clamping arms to engage and hold said support structure in fixed position at the end of the weighing operation in order to preserve the results of the determination, and mechanism associated with said trip mechanism constructed and arranged to actuate the latter at the end of the weighing operation.

6. In apparatus for quickly determining the volatile contents of a sample of granular material and for automatically preserving the results of the determination for future reference, the combination of a pan adapted to receive therewithin upon the bottom thereof a sample of the granular material the moisture content of which is to be determined, rotatable support structure supporting said pan and rotating the same about an inclined axis so that there will always be portions of the bottom of said pan elevated relative to the remaining portions whereby granular material contained within said pan will roll downwardly from the elevated portions to the lower portions during such rotation, a time controlled source of drying heat disposed above said pan while so supported and directed downwardly into the interior of said pan to dry the contents thereof, a weighing scale mounted adjacent said support structure and having a tiltable beam, a pan carrier adapted to engage and support said pan above its rotatable support structure, pan carrier support structure connecting said pan carrier with one end portion of said beam for vertical movement therewith and supporting said pan carrier and being movable downwardly with said pan carrier and said end portion to a retracted position as a result of tilting of said beam and being adapted to cause said pan carrier to engage said pan and lift it clear of said support structure and to weigh the same when said beam end portion is released, means for forcing said beam end portion downwardly and thereby retracting said pan carrier and causing said sample pan supporting means to support the sample pan, means for releasing said beam end portion to cause said pan carrier to rise and engage the sample pan for weighing, and time controlled clamp mechanism connected with the time controls of said source of heat and mounted adjacent said pan carrier support structure and constructed and arranged to engage and hold the same in fixed position at the termination of the weighing operation in order to preserve the results of the determination for future reference.

7. In apparatus for quickly determining the volatile contents of a sample of granular material and for automatically preserving the results of the determination. the combination of a sample pan adapted to receive therewithin a sample of granular material the volatile contents of which is to be determined, a plurality of roller elements rotatably mounted adjacent each other for rotation about non-parallel axes, said rollers during rotation having their uppermost portions disposed in a single inclined plane and being adapted to in part rotatably support such a pan having a sample of such granular material therewithin, at least a pair of flanged roller elements rotatably mounted adjacent said first mentioned roller elements and adapted to support such a pan with its flanges in said plane, mechanism for drivably rotating at least one of said flanged roller elements to rotate said pan about an upright but inclined axis in cooperation with said first mentioned roller elements, a timed controlled source of dry heat disposed above and adjacent to said roller elements and directed downwardly toward the same so as to dry the contents of such a pan when the latter is so supported, a weighing scale positioned below said rollers and having a tiltable beam, a pan carrier adapted to engage and support said pan, pan carrier support structure connecting said pan carrier with one end portion of said beam for vertical movement therewith and supporting said pan carrier and being movable downwardly with said pan carrier and said end portion to a retracted position by tilting said beam, means for forcing said beam end portion downwardly and thereby retracting said pan carrier and causing said sample pan supporting means to support the sample pan, means for releasing said beam end portion to cause said pan carrier to rise and engage the sample pan for weighing, and time controlled clamp mechanism coordinated with said source of heat and mounted adjacent said pan carrier support structure and constructed and arranged to engage and hold the same in fixed position at the termination of the weighing operation to preserve the results of the determination for future reference.

8. In apparatus for quickly determining the volatile contents of a sample of granular material contained within a sample pan and for automatically preserving the results of the determination for future reference, the combination of a plurality of roller elements mounted adjacent each other for rotation about their respective axes, said roller elements during rotation having their uppermost portions disposed in a single inclined plane and being adapted to support and rotate such a pan while having a sample of such granular material therewithin, mechanism for drivably rotating at least one of said roller elements to rotate such a pan about an upright and inclined axis, a time-controlled source of dry heat disposed above and adjacent to said roller elements and directed downwardly toward the same so as to dry the contents of such a pan when the latter is so supported, a weighing scale positioned below said roller elements and having a tiltable beam, a pan carrier adapted to engage and support such a pan, pan carrier support structure connecting said pan carrier with one end portion of said beam for vertical movement therewith and supporting said pan carrier and being movable downwardly with said pan carrier and said end portion to a retracted position by tilting said beam, releasable mechanism associated with said beam and constructed and arranged to tilt the same and thereby hold said pan carrier in retracted position, time-controlled mechanism connected with said releasable mechanism to cause the same to automatically release said scale beam upon the termination of the drying operation to cause said pan carrier to be released from retracted position and to rise and lift such a pan from said rollers to permit said scale to weigh the same, clamp mechanism mounted adjacent said pan carrier support structure in position to clamp the same in fixed position and to hold said scale in its weighing position, and time-controlled means connected with said clamp mechanism for causing said clamp mechanism to engage and hold said scale in its weighing position at the end of a brief interval after said pan carrier support is released from said retracted position and said sample is weighed.

9. In apparatus for quickly determining the volatile contents of a sample of granular material contained within a sample pan and for automatically preserving the results of the determination, the combination of a weighing scale having a tiltable beam, a pan carrier adapted to engage and support such a pan, pan carrier support structure connecting said pan carrier with one end portion of said beam for vertical movement therewith and supporting said pan carrier and being movable downwardly with said pan carrier and said end portion to a retracted position by tilting said beam, releasable mechanism disposed adjacent said beam and constructed and arranged to tilt the same and thereby hold said pan carrier in retracted position, means for supporting a sample pan with a sample of such material contained therewithin above said pan carrier and adjacent thereto while the latter is retracted, means for drying the contents of such a pan while so supported without scorching the sample, timing mechanism connected with said drying means for terminating the drying operation at the end of a predetermined period, mechanism connecting said timing mechanism with said releasable mechanism and causing the latter to automatically release said scale beam upon the termination of the drying operation to cause said pan carrier to be released from retracted position and to rise and lift such a pan from said supporting means to permit said scale to weigh the same, clamp mechanism mounted adjacent said pan carrier support in position to clamp the same in fixed position and to hold said scale in its weighing position, and means connected with said timing mechanism for causing said clamp mechanism to engage and hold said scale in its weighing position at the end of a brief interval after the drying operation is terminated.

References Cited in the file of this patent
UNITED STATES PATENTS

| | | |
|---|---|---|
| 2,016,703 | Breaden et al. | Oct. 8, 1935 |
| 2,047,765 | Brabender | July 14, 1936 |